United States Patent
Locks et al.

(10) Patent No.: US 11,568,468 B2
(45) Date of Patent: Jan. 31, 2023

(54) SYSTEM, METHOD, AND COMPUTER PROGRAM FOR PROVIDING SIMILAR PRODUCT RECOMMENDATIONS FOR NON-MERCHANT PUBLISHERS BASED ON PUBLISHER PREFERENCES

(71) Applicant: Shopstyle Inc., San Mateo, CA (US)

(72) Inventors: Brent Dore Locks, San Mateo, CA (US); David Andrew Peck, San Francisco, CA (US)

(73) Assignee: Rakuten Group, Inc., Tokyo (JP)

( * ) Notice: Subject to any disclaimer, the term of this patent is extended or adjusted under 35 U.S.C. 154(b) by 20 days.

(21) Appl. No.: 16/918,706

(22) Filed: Jul. 1, 2020

(65) Prior Publication Data

US 2021/0042812 A1     Feb. 11, 2021

Related U.S. Application Data

(60) Provisional application No. 62/884,627, filed on Aug. 8, 2019.

(51) Int. Cl.
    G06Q 30/00     (2012.01)
    G06Q 30/06     (2012.01)
    (Continued)

(52) U.S. Cl.
    CPC ..... *G06Q 30/0631* (2013.01); *G06Q 30/0613* (2013.01); *G06Q 30/0643* (2013.01); *H04L 67/133* (2022.05); *H04L 67/567* (2022.05)

(58) Field of Classification Search
    None
    See application file for complete search history.

(56) References Cited

U.S. PATENT DOCUMENTS

| | | | |
|---|---|---|---|
| 4,910,672 | A | 3/1990 | Off et al. |
| 5,250,789 | A | 10/1993 | Johnsen |

(Continued)

FOREIGN PATENT DOCUMENTS

| | | |
|---|---|---|
| CN | 101194282 | 6/2008 |
| JP | 10-240823 | 9/1998 |

(Continued)

OTHER PUBLICATIONS

Au-Yong-Oliveria, Manuel, Strain Effect—A Case Study About the Power of Nano-Influencers, Jun. 1, 2019, 2019 14th Iberian Conference on Information Systems and Technologies, pp. 1-5 (Year: 2019).*

(Continued)

*Primary Examiner* — Jeffrey A. Smith
*Assistant Examiner* — Timothy J Kang
(74) *Attorney, Agent, or Firm* — Lessani Law Group, PC

(57) ABSTRACT

The present disclosure relates to a system, method, and computer program for automatically providing similar product recommendations for sold-out products promoted on non-merchant publisher sites, wherein the similar product recommendations are filtered for publisher preferences. A computer system with a product database provides a platform that enables non-merchant publishers to search products in the database, create call-to-actions on publisher sites for products in the database, and automatically receive similar product recommendations when end users of the publisher sites attempt to purchase promoted products that are now sold out. Once a publisher creates a call-to-action for a product that subsequently becomes sold out, similar product recommendations are provided without requiring any action on the publisher's part to change the publisher's site. Similar product recommendations are tailored to each publisher to account for publisher preferences. Publisher (Continued)

preferences may be learned by the system based on publisher behavior or inputted by each publisher.

15 Claims, 5 Drawing Sheets

(51) Int. Cl.
   *H04L 67/133* (2022.01)
   *H04L 67/567* (2022.01)

(56) References Cited

U.S. PATENT DOCUMENTS

| | | | |
|---|---|---|---|
| 5,500,890 | A | 3/1996 | Rogge et al. |
| 6,029,141 | A | 2/2000 | Bezos et al. |
| 6,101,482 | A | 8/2000 | DiAngelo et al. |
| 6,128,600 | A | 10/2000 | Imamura et al. |
| 6,341,353 | B1 | 1/2002 | Herman et al. |
| 6,460,036 | B1 | 10/2002 | Herz et al. |
| 6,571,279 | B1 | 5/2003 | Herz et al. |
| 6,611,814 | B1 | 8/2003 | Lee et al. |
| 6,725,222 | B1 | 4/2004 | Musgrove et al. |
| 7,162,443 | B2 | 1/2007 | Shah |
| 7,305,355 | B2 | 12/2007 | Tarvydas et al. |
| 7,328,176 | B2 | 2/2008 | Tarvydas et al. |
| 7,512,548 | B1 | 3/2009 | Bezos et al. |
| 7,734,729 | B2 | 6/2010 | Du et al. |
| 7,752,535 | B2 | 7/2010 | Satyavolu |
| 7,925,546 | B2 | 4/2011 | Jacobi et al. |
| 8,036,934 | B2 | 10/2011 | Mankoff |
| 8,176,067 | B1 | 5/2012 | Ahmad et al. |
| 8,224,935 | B1 | 7/2012 | Bandopadhyay et al. |
| 8,359,309 | B1 | 1/2013 | Provine et al. |
| 8,392,288 | B1 | 3/2013 | Miller |
| 8,489,456 | B2 | 7/2013 | Burgess et al. |
| 8,510,166 | B2 | 8/2013 | Neven |
| 8,527,436 | B2 | 9/2013 | Salaka et al. |
| 8,661,029 | B1 | 2/2014 | Kim et al. |
| 8,676,665 | B2 | 3/2014 | Tarvydas et al. |
| 8,694,511 | B1 | 4/2014 | Corduneanu et al. |
| 8,812,532 | B2 | 8/2014 | Skaf |
| 8,844,010 | B2 | 9/2014 | Brady et al. |
| 8,935,192 | B1 * | 1/2015 | Ventilla .......... G06N 20/00 706/46 |
| 9,159,079 | B2 | 10/2015 | Lambert et al. |
| 9,201,672 | B1 | 12/2015 | Arana et al. |
| 9,384,504 | B2 | 7/2016 | Lampert |
| 9,779,441 | B1 | 10/2017 | Jadhav et al. |
| 9,922,327 | B2 | 3/2018 | Johnson et al. |
| 10,540,698 | B2 | 1/2020 | Pratt et al. |
| 10,740,781 | B2 | 8/2020 | Tam et al. |
| 10,970,755 | B2 | 4/2021 | Doubinski et al. |
| 2001/0032128 | A1 | 10/2001 | Kepecs |
| 2001/0049628 | A1 | 12/2001 | Icho |
| 2001/0056359 | A1 | 12/2001 | Abreu |
| 2002/0038255 | A1 | 3/2002 | Tarvydas et al. |
| 2002/0046109 | A1 | 4/2002 | Leonard et al. |
| 2002/0095335 | A1 | 7/2002 | Barnett et al. |
| 2002/0117544 | A1 | 8/2002 | Wolf et al. |
| 2002/0124255 | A1 | 9/2002 | Reichardt et al. |
| 2002/0143660 | A1 | 10/2002 | Himmel et al. |
| 2003/0158844 | A1 | 8/2003 | Kramer et al. |
| 2004/0083134 | A1 | 4/2004 | Spero et al. |
| 2004/0122736 | A1 | 6/2004 | Strock et al. |
| 2004/0254855 | A1 | 12/2004 | Shah |
| 2005/0131768 | A1 | 6/2005 | Rodriguez et al. |
| 2005/0267809 | A1 | 12/2005 | Zheng |
| 2006/0085255 | A1 | 4/2006 | Hastings et al. |
| 2006/0122899 | A1 | 6/2006 | Lee et al. |
| 2006/0129463 | A1 | 6/2006 | Zicherman |
| 2006/0242011 | A1 | 10/2006 | Bell et al. |
| 2006/0259364 | A1 | 11/2006 | Strock et al. |
| 2006/0265281 | A1 | 11/2006 | Sprovieri et al. |
| 2007/0033531 | A1 | 2/2007 | Marsh |
| 2007/0050258 | A1 | 3/2007 | Dohse |
| 2007/0203784 | A1 | 8/2007 | Keller et al. |
| 2007/0271147 | A1 | 11/2007 | Crespo et al. |
| 2008/0005090 | A1 | 1/2008 | Khan et al. |
| 2008/0033939 | A1 | 2/2008 | Khandelwal |
| 2008/0103887 | A1 | 5/2008 | Oldham et al. |
| 2008/0109327 | A1 | 5/2008 | Mayle et al. |
| 2008/0120129 | A1 | 5/2008 | Seubert et al. |
| 2008/0154731 | A1 | 6/2008 | Mesaros |
| 2008/0155547 | A1 | 6/2008 | Weber et al. |
| 2008/0208606 | A1 | 8/2008 | Allsop et al. |
| 2008/0319854 | A1 | 12/2008 | Duroux et al. |
| 2009/0024464 | A1 | 1/2009 | Weiss et al. |
| 2009/0083164 | A1 | 3/2009 | Hull et al. |
| 2009/0099920 | A1 | 4/2009 | Aharoni et al. |
| 2009/0234737 | A1 | 9/2009 | Sarelson et al. |
| 2009/0240588 | A1 | 9/2009 | Turner et al. |
| 2010/0042515 | A1 | 2/2010 | Crespo et al. |
| 2010/0049538 | A1 | 2/2010 | Frazer et al. |
| 2010/0070448 | A1 | 3/2010 | Omoigui |
| 2010/0161399 | A1 | 6/2010 | Posner et al. |
| 2010/0174623 | A1 | 7/2010 | McPhie et al. |
| 2010/0205068 | A1 | 8/2010 | Hodson et al. |
| 2011/0022448 | A1 | 1/2011 | Strock et al. |
| 2011/0035379 | A1 | 2/2011 | Chen et al. |
| 2011/0060998 | A1 | 3/2011 | Schwartz et al. |
| 2011/0106605 | A1 | 5/2011 | Malik et al. |
| 2011/0131098 | A1 * | 6/2011 | Bafia .......... G06Q 30/02 705/14.69 |
| 2011/0167456 | A1 | 7/2011 | Kokenos et al. |
| 2011/0173097 | A1 | 7/2011 | McKee |
| 2011/0191181 | A1 | 8/2011 | Blackhurst et al. |
| 2011/0191310 | A1 | 8/2011 | Liao et al. |
| 2012/0078731 | A1 | 3/2012 | Linevsky et al. |
| 2012/0158705 | A1 | 6/2012 | Konig et al. |
| 2012/0166268 | A1 | 6/2012 | Griffiths |
| 2012/0197700 | A1 | 8/2012 | Kalin |
| 2012/0197753 | A1 | 8/2012 | Kalin |
| 2012/0203632 | A1 | 8/2012 | Blum et al. |
| 2012/0271691 | A1 | 10/2012 | Hammad et al. |
| 2012/0284108 | A1 | 11/2012 | Fontana et al. |
| 2012/0311509 | A1 | 12/2012 | Maggiotto et al. |
| 2013/0006803 | A1 | 1/2013 | Oskolkov et al. |
| 2013/0024282 | A1 | 1/2013 | Kansal |
| 2013/0030853 | A1 | 1/2013 | Agarwal et al. |
| 2013/0046621 | A1 | 2/2013 | Asseoff et al. |
| 2013/0073356 | A1 | 3/2013 | Cooper et al. |
| 2013/0144706 | A1 | 6/2013 | Qawami et al. |
| 2013/0173364 | A1 | 7/2013 | Choong et al. |
| 2013/0179303 | A1 | 7/2013 | Petrou et al. |
| 2013/0185125 | A1 | 7/2013 | Celorio-Martinez et al. |
| 2013/0204748 | A1 | 8/2013 | Sugiura |
| 2013/0246199 | A1 | 9/2013 | Carlson |
| 2013/0304563 | A1 | 11/2013 | Haupt et al. |
| 2013/0346221 | A1 | 12/2013 | Rangachari et al. |
| 2014/0006165 | A1 | 1/2014 | Grigg et al. |
| 2014/0100929 | A1 | 4/2014 | Burgess et al. |
| 2014/0122203 | A1 | 5/2014 | Johnson et al. |
| 2014/0129308 | A1 | 5/2014 | Rappoport |
| 2014/0143251 | A1 | 5/2014 | Wang et al. |
| 2014/0172536 | A1 | 6/2014 | Korzenko et al. |
| 2014/0200997 | A1 | 7/2014 | Anderson et al. |
| 2014/0207551 | A1 | 7/2014 | Van Der Spoel |
| 2014/0214508 | A1 | 7/2014 | Lee et al. |
| 2014/0279214 | A1 | 9/2014 | Wagoner-Edwards et al. |
| 2014/0372193 | A1 | 12/2014 | Jorgensen et al. |
| 2015/0032522 | A1 | 1/2015 | Dintenfass et al. |
| 2015/0032538 | A1 | 1/2015 | Calman et al. |
| 2015/0032602 | A1 | 1/2015 | Blackhurst et al. |
| 2015/0039481 | A1 | 2/2015 | Els et al. |
| 2015/0088607 | A1 | 3/2015 | Georgoff et al. |
| 2015/0112774 | A1 | 4/2015 | Georgoff et al. |
| 2015/0112789 | A1 | 4/2015 | Yadati et al. |
| 2015/0112836 | A1 | 4/2015 | Godsey et al. |
| 2015/0178820 | A1 | 6/2015 | Green et al. |
| 2015/0220979 | A1 | 8/2015 | Ouimet et al. |
| 2015/0302424 | A1 | 10/2015 | Akbarpour et al. |
| 2015/0310468 | A1 | 10/2015 | Mesaros |
| 2015/0347595 | A1 | 12/2015 | Norman et al. |
| 2015/0348140 | A1 | 12/2015 | Campbell |

(56) References Cited

U.S. PATENT DOCUMENTS

| | | |
|---|---|---|
| 2016/0110762 A1 | 4/2016 | Mastierov et al. |
| 2016/0140610 A1 | 5/2016 | McDonough |
| 2017/0039583 A1 | 2/2017 | Aissa |
| 2017/0148046 A1 | 5/2017 | Akbarpour Mashadi et al. |
| 2018/0089692 A1 | 3/2018 | Johnson et al. |
| 2018/0108054 A1 | 4/2018 | Doubinski et al. |
| 2018/0315067 A1 | 11/2018 | Shi et al. |
| 2019/0130433 A1 | 5/2019 | Tam et al. |
| 2020/0334704 A1 | 10/2020 | Tam et al. |

FOREIGN PATENT DOCUMENTS

| | | |
|---|---|---|
| JP | 11-134408 | 5/1999 |
| JP | 2000-163480 | 6/2000 |
| JP | 2001-109742 | 4/2001 |
| JP | 2002-063431 | 2/2002 |
| JP | 2002-245366 | 8/2002 |
| JP | 2002-259792 | 9/2002 |
| JP | 2002-312608 | 10/2002 |
| JP | 2008-040753 | 2/2008 |
| JP | 2012-093953 | 5/2012 |
| JP | 2013-218697 | 10/2013 |
| JP | 2015-082134 | 4/2015 |
| KR | 1020010077123 | 8/2001 |
| KR | 1020090008777 | 1/2009 |
| KR | 20100040829 | 4/2010 |
| KR | 1020100099843 | 9/2010 |
| KR | 1020110055182 | 5/2011 |
| KR | 1020110120241 | 11/2011 |
| RU | 2428741 | 9/2011 |
| WO | 2012074919 | 6/2012 |
| WO | 2012103462 | 8/2012 |
| WO | 2012165033 | 12/2012 |
| WO | 2014205552 | 12/2014 |
| WO | 2018071673 | 4/2018 |

OTHER PUBLICATIONS

Amazon, "Creating a Wish List", available Feb. 25, 2011, retrieved May 29, 2014, http://www.amazon.com/gp/help/customer/display.html?ie=UTF8&nodeId=501088.

Bajaj, "Shopping for Diwali? Here's how you can crack the best online deals", Oct. 20, 2016, pp. 1-3.

Impulse, "Save your favorite products on an impulse. Buy them when you're ready", retrieved Oct. 23, 2016, pp. 1-2.

Keepa, "Features", retrieved Oct. 23, 2016, p. 1-1.

Nakamura, "Out-of-Browser" Function Supported Outside the Web Browser, Oct. 1, 2009, vol. 94, p. 154-155.

Owen et al., "Going Beyond Redemption: Closing the Loop with Card-Linked Offers", Jul. 12, 2012, pp. 1-8.

Shoptagr, "When you discover something you want, save it to Shoptagr", retrieved Oct. 23, 2016, p. 1 -1.

Taggr, "Wish List any Store & Price Watch", retrieved Oct. 23, 2016, p. 1-1.

Ziftr Alerts, "You do the shopping. We'll do the searching. It's that simple", retrieved Oct. 23, 2016, pp. 1-2.

Nishlist, "Extension for Wishlist App", retrieved Oct. 23, 2016, p. 1-1.

Wishtack, "Gift Ideas & Wishlist", retrieved Oct. 23, 2016, p. 1-1.

Word Press, "Status Tracking", retrieved Oct. 25, 2016, pp. 1-4.

* cited by examiner

Maintain a product database with products from a plurality of merchants. Each product entry is associated with a product ID, a product title and/or description, an associated merchant, a link to a webpage on the associated merchant's site, and an indicator of whether the product is in stock at the associated merchant.
110

Provide a user interface to the product database that enables a plurality of non-merchant publishers, each associated with a different publisher website, to register with the system, search the product database, and create call-to-actions on the different publisher websites with respect to products in the product database
120

Provide an application programming interface to the system that enables the system to receive (via client applications running non-merchant publisher sites) call-to-action selections on publisher sites from end users with respect to products in the product database
130

Receive, at the application programming interface, end users' call-to-action requests to purchase products in the product database
135

For each request, is the product in stock?
140

—Yes→ Redirect client application to merchant webpage for the product
145

No

For each call-to-action request received for a product that is out of stock, identify a plurality of similar products to the out-of-stock product in the product database by comparing product images and/or product metadata in the product database
150

Example Implementation Using Product Widgets

SYSTEM, METHOD, AND COMPUTER PROGRAM FOR PROVIDING SIMILAR PRODUCT RECOMMENDATIONS FOR NON-MERCHANT PUBLISHERS BASED ON PUBLISHER PREFERENCES

RELATED APPLICATIONS

This application claims the benefit of U.S. Provisional Application No. 62/884,627 filed on Aug. 8, 2019, and titled "System, Method, and Computer Program for Providing Similar Product Recommendations for Non-Merchant Publishers based on Publisher Preferences," the contents of which are incorporated by reference herein as if fully disclosed herein.

BACKGROUND OF THE INVENTION

1. Field of the Invention

This invention relates generally to ecommerce systems, and, more specifically, to a system that provides similar product recommendations for non-merchant publishers based on publisher preferences.

2. Description of the Background Art

The role of influencers and bloggers in commerce is growing rapidly. Many shoppers, especially younger generations, prefer to purchase products that are vetted and recommended by a trusted influencer. Certain providers of digital shopping platforms, such as SHOPSTYLE, maintain product databases and search engines that are accessible to third-party, non-merchant publishers (e.g., bloggers, influencers, etc.). Non-merchant publishers are able to search the product database and insert links to products in the database in their sites. When a user of a publisher site clicks on a linked product, the user is redirected to the applicable merchant webpage for the product. The user's shopping session on the merchant's site is associated with the digital shopping platform, which receives a commission for any sale made during the session, and in turn passes a share of it to the publisher.

The Internet "shelf life" of blog posts (or other non-merchant publisher posts) tend to be significantly longer than the availability of the products recommended in the posts. Therefore, when a product referenced in a post is sold out, it would be helpful to provide the user with similar product recommendations.

SUMMARY OF THE DISCLSOURE

The present disclosure relates to a system, method, and computer program for automatically providing similar product recommendations for sold-out products promoted on non-merchant publisher sites, wherein the similar product recommendations are filtered for publisher preferences. A computer system with a product database provides a platform that enables non-merchant publishers to search products in the database, create call-to-actions (e.g., a "buy" button) on publisher sites for products in the database, and automatically receive similar product recommendations when end users of the publisher sites attempt to purchase promoted products that are now sold out. Once a publisher creates a call-to-action for a product that subsequently becomes sold out, similar product recommendations are provided without requiring any action on the publisher's part to change the publisher's site. Similar product recommendations are tailored to each publisher to account for publisher preferences. In certain embodiments, publisher preferences are learned by the system based on publisher behavior, and in other embodiments, publisher preferences are inputted by each publisher.

In one embodiment, providing the platform comprises the following steps:
  maintaining a product database with products from a plurality of merchants, wherein each product entry in the database is associated with a product ID, an associated merchant, a link to a webpage on the associated merchant's site, and an indicator of whether the product is in stock at the associated merchant;
  providing a user interface to the product database that enables a plurality of non-merchant publishers, each associated with a different non-merchant publisher site, to search the product database and to create call-to-actions on the different non-merchant publisher sites with respect to products in the product database;
  providing an application programming interface to the system that enables the system to receive call-to-action selections from end users of the different non-merchant publisher sites with respect to products in the product database;
  receiving, at the application programming interface, call-to-action selections from end users on the different non-merchant publisher sites for products in the product database that are out-of-stock, wherein the call-to-action selections are entered through the non-merchant publisher sites and transmitted by client applications running the non-merchant publisher sites;
  for each of the call-to-action selections received for products that are out of stock, performing the following:
    identifying a plurality of similar products to the out-of-stock product in the product database by comparing product images and/or product metadata in the product database;
    filtering the identified similar products by one or more publisher preferences specific to the non-merchant publisher associated with the call-to-action selection; and
    enabling the end user that made the call-to-action selection to view information on one or more of the filtered and identified similar products.

BRIEF DESCRIPTION OF THE DRAWINGS

FIGS. 1A-B are flowcharts that illustrate a method, according to one embodiment, for providing similar product recommendations on a digital shopping platform accessible to multiple non-merchant publishers.

DETAILED DESCRIPTION OF THE PREFERRED EMBODIMENTS

The present disclosure relates to a system, method, and computer program for automatically providing similar product recommendations for sold-out products promoted on non-merchant publisher sites, wherein the similar product recommendations are filtered for publisher preferences. Specifically, a digital shopping platform is provided that enables third-party, non-merchant publishers to search a product database with products from multiple merchants, create call-to-actions on the non-merchant publisher sites with respect to products in the database, and automatically receive similar product recommendations when end users of the publisher sites attempt to purchase promoted products in the database that are now sold out. Once a publisher creates a call-to-action for a product that subsequently becomes sold out, similar product recommendations are provided without requiring any action on the publisher's part to change the publisher's site. The platform is accessible to multiple non-merchant publishers that promote merchant products. The method is performed by a computer system ("the system"). The term "publisher" herein references to non-merchant publishers that promote third party merchant products. A "publisher site" is a publisher's website or mobile application content.

Figure 1B:
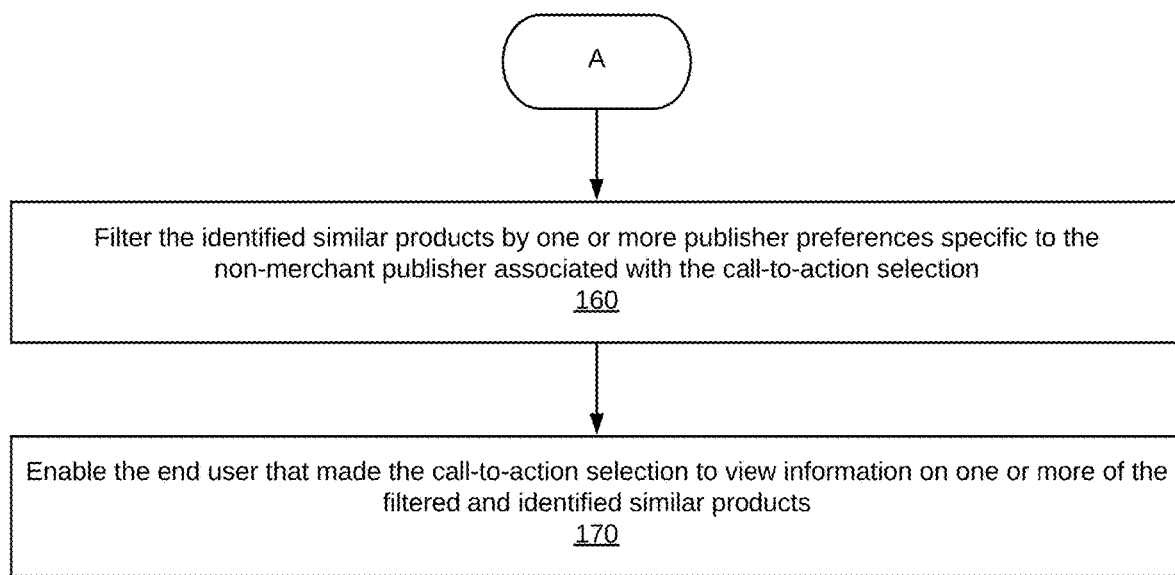

FIGS. 1A-B illustrate a method for providing similar product recommendations on a digital shopping platform accessible to multiple non-merchant publishers. The system maintains a product database with products from a plurality of merchants (step 110). In one embodiment, each product entry is associated with a product ID, a product title and/or description, a product image, an associated merchant, a link to a webpage on the associated merchant's site, and an indicator of whether the product is in stock at the associated merchant.

The system provides a publisher user interface to the product database that enables a plurality of non-merchant publishers, each associated with a different publisher site, to register with the system, access the product database, and create call-to-actions on the different publisher sites with respect to products in the product database (step 120). An example of a call-to-action is a "buy" button or link that redirects an end user of the non-merchant publisher site to a merchant product webpage from which the end user can purchase a product promoted on the publisher's site.

The system provides an application programming interface (API) that enables the system to receive, via client applications running non-merchant publishers' sites, call-to-action selections on non-merchant publisher sites from the end users with respect to products in the product database (step 130). An end user initiates the call-to-action from a non-merchant publisher site. The system can receive call-to-action requests from many different non-merchant publisher sites. Examples of client applications that can run non-merchant publisher sites are web browsers and mobile applications.

In response to receiving a call-to-action request to purchase a product, the system determines whether the product is in stock at the merchant associated with the product (steps 135, 140). If so, the system redirects the end user's client application (e.g., web browser) to a page on the merchant's site for the product (step 145). The end user's shopping session on the merchant's site is associated with the system, which typically provides the publisher with a share of any commission received from the merchant for product(s) purchased during the session.

In response to receiving a call-to-action to purchase a product that is out-of-stock, the system identifies a plurality of similar products to the out-of-stock product in the product database by comparing product images and/or product metadata in the product database (step 150). For example, the system may search the product database for products with similar metadata or the same GTIN number (a 14-digit number that is used to identify trade items, products or services). Visual image analysis of product images may be used to identified similar products. The visual image analysis may be performed by the system or by a third-party source. In one embodiment, the system uses a combination of metadata searches and visual image analysis to identify similar products.

Identifying a plurality of similar products in step 150 may mean identifying similar products in real-time or retrieving information for previously-identified similar products. In certain embodiments, the system may identify the similar products in advance of receiving the call-to-action request and then retrieve information about the identified similar products in response to receiving the call-to-action request. For example, system may track the products in the database for which non-merchant publishers have created call-to-actions, and, in response to any of these products going out of stock, identify similar products and cache this information for quick retrieval upon receiving a call-to-action request.

The system filters the identified similar products by one or more publisher preferences specific to the non-merchant publisher associated with the call-to-action request (step 160). In one embodiment, the publisher preferences are explicit preferences specified by the publisher when the publisher registers with the system or updates his/her profile in the system. In an alternate embodiment, the system ascertains publisher preferences based on past publisher behavior. For example, the system may track the merchants associated with products in the product database to which the publisher links, the typical price range of products to which the publisher links, the type of products, etc. The system may filter out identified similar products that are inconsistent with the publisher's past behavior. For example, the system may filter out identified similar products from merchants to whom the publisher has never linked or filter products that are outside a price range of products typically promoted by the publisher. After filtering the similar product search results by one or more publisher preferences, the system enables the end user that made the call-to-action selection to view information on one or more of the filtered and identified similar products (step 170).

In certain embodiments, the system enables publishers to create call-to-actions for products in the product database using "product widgets." Product widgets are software code that enable certain functionality in a web browser or mobile application with respect to products associated with the widget. For example, a product widget may display a product image, a title or brief description, and a "buy" button for purchasing the displayed product, and it may initiate the call-to-action request to the system in response to an end user selecting the "buy" button.

In certain embodiments, the system provides a user interface for publishers that enables them to create instances of widgets and associate them with products in the product database. The user interface displays one or more widgets. Each widget type may display product information differently. The user interface enables the publisher to select a widget and associate one or more products in the product database with an instance of the selected widget. Each instance of a widget has a unique widget ID. Each widget ID is mapped to product identifiers for the products associated with the instance of the widget. The widget ID also is associated with a publisher ID for the publisher that created the instance of the widget. The user interface enables the publisher to copy the software code for the instance of the widget. The publisher can then incorporate the code into the publisher's website or mobile application.

Figure 2:
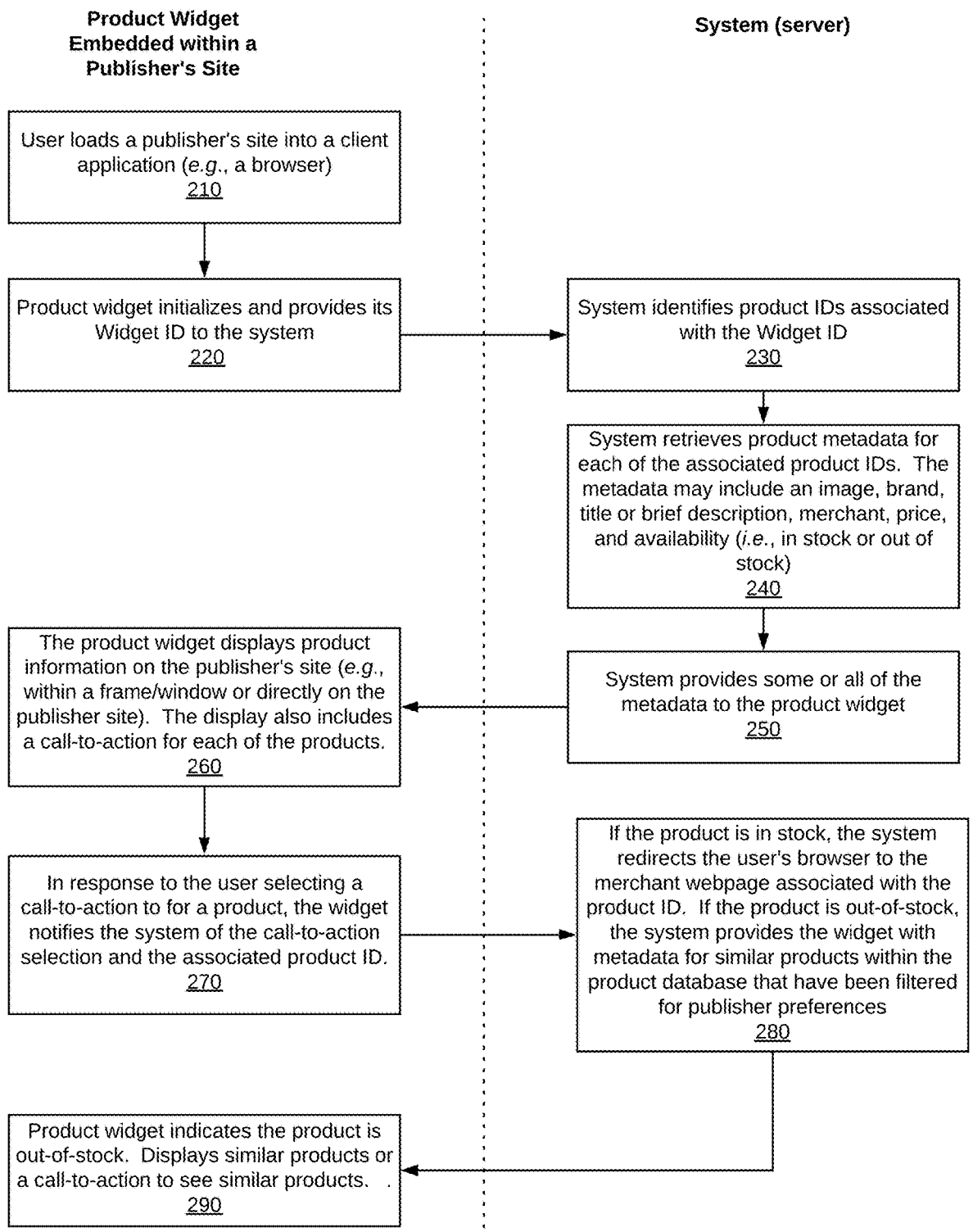
FIG. 2 is a flowchart that illustrates an example implementation of the method of FIG. 1 in which product widgets are used to display product information and initiate call-to-action requests.

FIG. 2 illustrates an example implementation of the method of FIG. 1 in which product widgets are used to display product information and initiate call-to-action requests. In response to an end user loading the publisher's site into a browser or opening a publisher's mobile application, a product widget in the publisher's site initializes and provides its widget ID to the system (steps 210, 220). As discussed above, each widget ID is associated with one or more product IDs, and the system identifies the product IDs associated with the widget ID (step 230).

The system retrieves product metadata associated with each of the identified product IDs (step 240). The metadata may include an image of the product, the brand of the product, a title or brief description of the product, the merchant selling the product, the price, and the current availability (i.e., in stock or out of stock). The metadata may be retrieved from a cached index of products or the product database. The system provides some or all of the product metadata to the requesting widget (step 250).

The widget uses the product metadata to display product information on the publisher sites (step 260). For example, for each product associated with the widget, the widget may display an image of the product, a title, and a price. The widget also displays a call-to-action, such as a "buy" button, for each product associated with the widget. The widget may display the product information and call-to-action directly on the publisher's site or within a frame/window on the site.

In response to a user selecting a call-to-action to purchase a product, the widget notifies the system of the call-to-action selection, along with the associated product ID (step 270). The system uses the product ID to look up availability information in the product database or a cached product index. If the product is in stock, the server redirects the user's browser to the merchant webpage associated with the product ID (step 280). If the product is out-of-stock, the system notifies the widget and provides the widget with metadata for similar products within the product database that have been filtered for publisher preferences (also step 280). As discussed above, similar products may be identified by searching product metadata within the system and/or doing visual analysis to identify similar-looking products.

In response to receiving notification that a product is out-of-stock, the widget indicates the product is out-of-stock on the publisher's site (step 290). For example, the widget may display a notice that the product is out-of-stock, as well as a call-to-action that enables a user to see similar products. If the user clicks on the call-to-action to see similar products, the widget displays a window/frame/modal window (e.g., an iframe) with similar products. Each similar product is displayed with a call-to-action for buying the product. If a user clicks on a call-to-action for a similar product, the system repeats steps 280 and, if applicable, 290 for the similar product.

In certain embodiments, the system notifies a widget of any out-of-stock products associated with the widget upon the widget initializing. In such cases, the call-to-action initially displayed by the widget on the publisher's site may be a call-to-action to see similar products.

Figure 3:
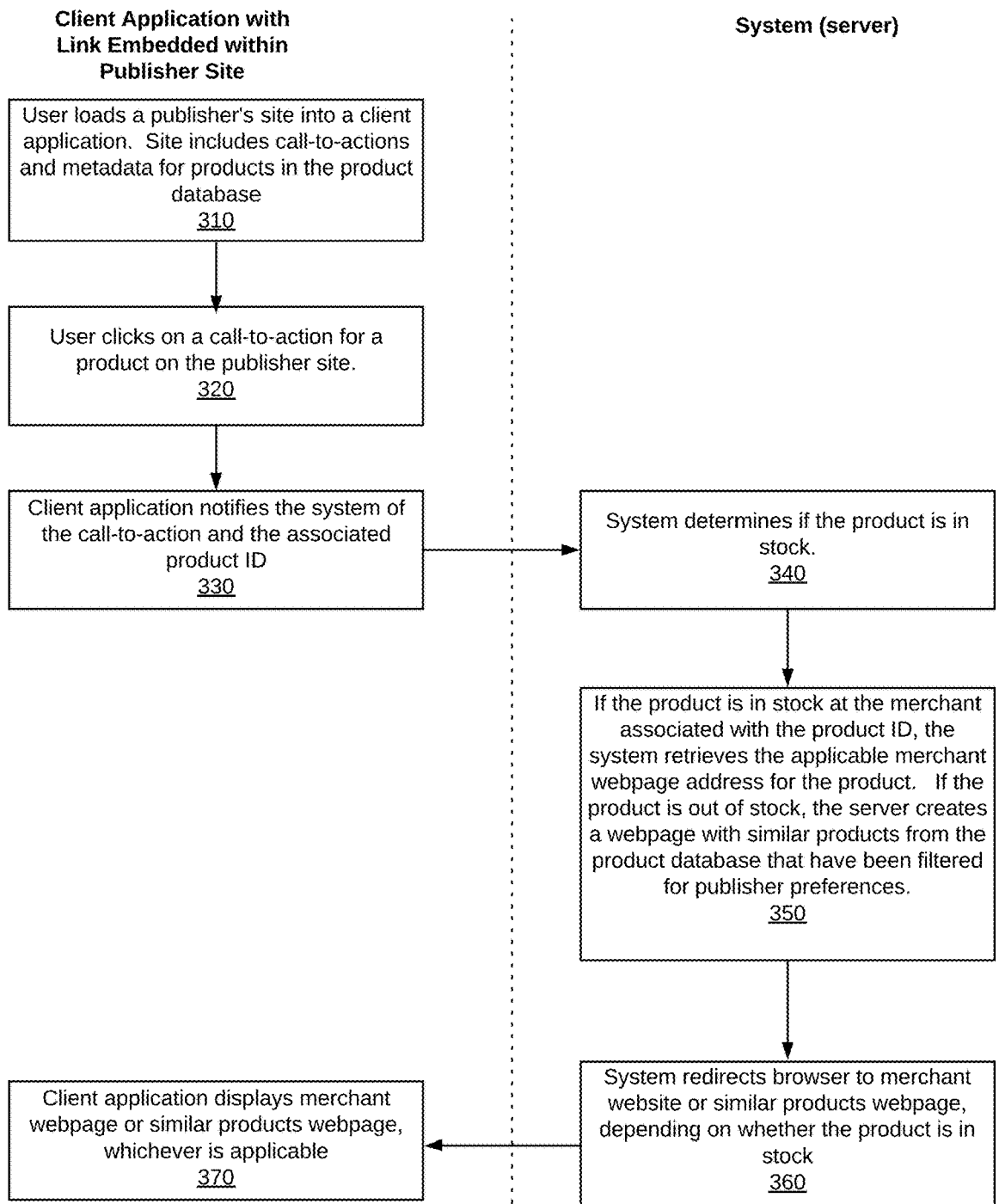
FIG. 3 is a flowchart that illustrates an alternate example implementation of the method of FIG. 1.

FIG. 3 illustrates an alternate implementation of the method of FIG. 1. In this implementation, the system enables users to create links to products in the product database and incorporate the links directly into the publisher site in the form of call-to-actions (e.g., a "buy" button). In response to a user clicking on a call-to-action to purchase a product on the publisher site, the user's client application (e.g., a web browser or mobile app), notifies the system of the call-to-action and provides the associated product ID (steps 310, 320, and 330). The system then determines if the product is in stock by using the product ID to look up product information in a cached product index or the product database (step 340). If the product is in stock at the merchant associated with the product ID, the server retrieves the applicable merchant webpage address for the product (step 350). If the product is out of stock, the system creates a webpage with similar products from the product database that have been filtered for publisher preferences (also step 350). The system then redirects the client application to the merchant website or the similar products page, depending on whether the product is in stock (step 360). The client application displays the merchant webpage or similar products webpage, whichever is applicable (step 370). If the user selects a product in the similar products webpage that is also out-of-stock, steps 350-370 are repeated with respect to the selected similar product. Also, the similar products may be filtered for availability in addition to publisher preferences.

Figure 4:
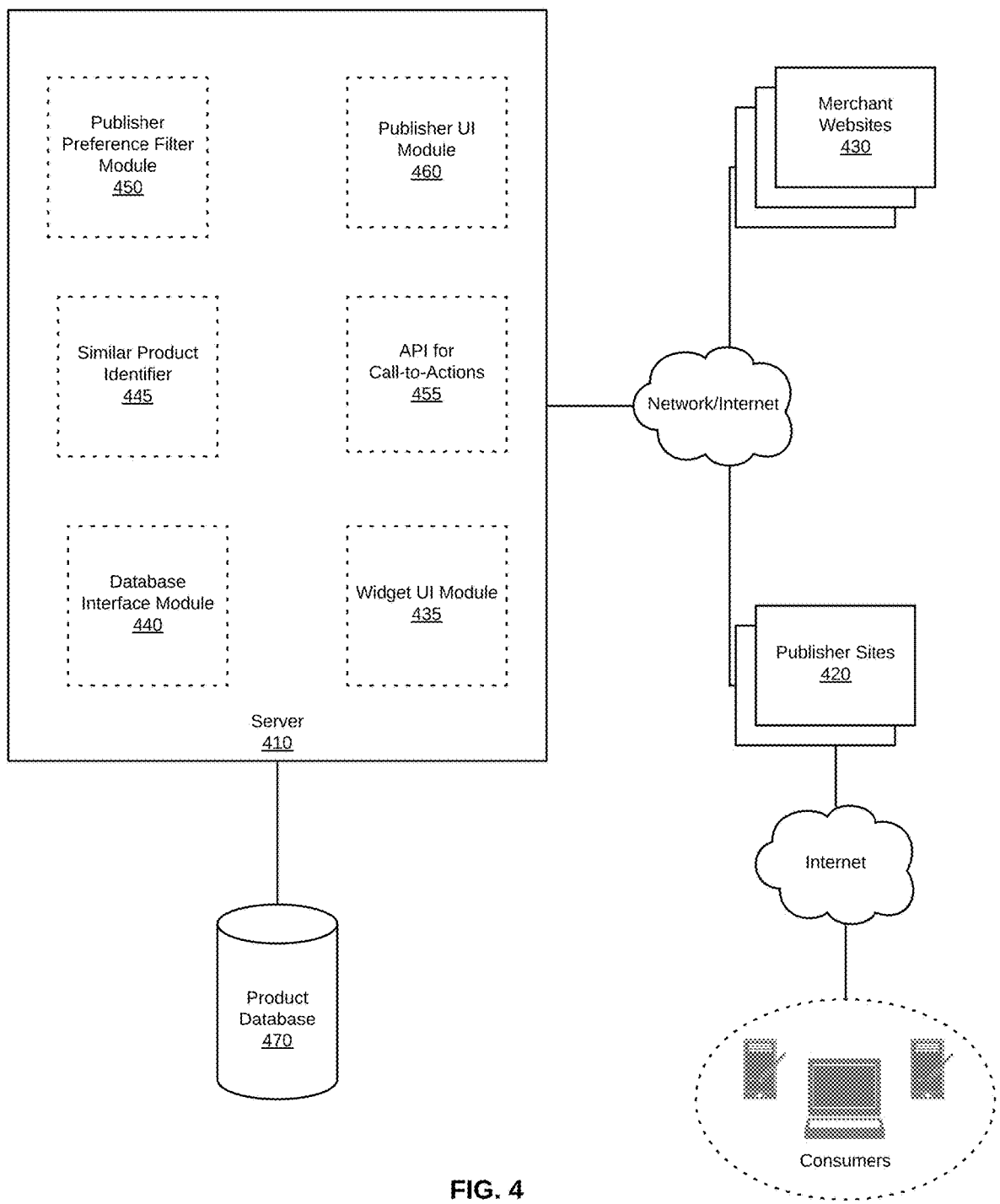
FIG. 4 is a block diagram that illustrates an example system architecture.

FIG. 4 illustrates an example system architecture. The system includes a product database 470 and a server 410 that runs a plurality of software modules. The software modules include the following:

Publisher UI module 460 for generating the user interfaces that enable the publisher to register with the system and search the product database.

Widget UI module 435 for generating the user interfaces that enable publishers to create widgets or call-to-actions to products in the product database 470.

Database interface module 440 for searching, retrieving, and storing information in the product database 470.

API 455 for receiving and processing call-to-action requests from client applications displaying publisher sites.

Similar Product Identifier module 445 for identify similar products to an out-of-stock product. Module 445 may interface with third party systems, such as system that identify similar products based on image analysis.

Publisher Preference Filter module 450 for filtering similar products based on learned or explicit publisher preferences.

Server 410 interfaces with publisher sites 420 and merchant websites 430 for the purpose of providing product information to end users, processing call-to-action requests, and redirecting customers to merchants' sites, as described above.

The methods described herein may be implemented in a system configured differently and are not limited to the system architecture illustrated in FIG. 4.

The methods described herein are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A method, performed by a computer system, for enabling similar product recommendations on a plurality of non-merchant publisher sites that promote merchant products, wherein the non-merchant publishers are not affiliated with the merchants and wherein the similar product recommendations are for sold-out products, the method comprising:
  maintaining a product database with products from a plurality of merchants, wherein each product entry in the database is associated with a product ID, an associated merchant, a link to a webpage on the associated merchant's site, and an indicator of whether the product is in stock at the associated merchant;
  providing a user interface to the product database that enables a plurality of non-merchant publishers, each associated with a different non-merchant publisher site, to search the product database and to create call-to-actions on the different non-merchant publisher sites with respect to products in the product database, wherein a call-to-action uses a product widget that displays product information for a product in the product database and a call-to-action button for purchasing the product, and wherein the product widget initiates a call-to-action request to the system in response to an end user selecting the call-to-action button;
  providing an application programming interface to the system that enables the system to receive call-to-action selections from end users of the different non-merchant publisher sites with respect to products in the product database;
  receiving, at the application programming interface, call-to-action selections from end users on the different non-merchant publisher sites for products in the product database that are out of stock, wherein the call-to-action selections are entered through the non-merchant publisher sites and transmitted by client applications running the non-merchant publisher sites;
  for each of the call-to-action selections received for products that are out of stock, performing the following:
    identifying a plurality of similar products to the out-of-stock product in the product database by comparing product images and/or product metadata in the product database;
    filtering the identified similar products by one or more publisher preferences specific to the non-merchant publisher associated with the call-to-action selection; and
    displaying, using the product widget, a call-to-action button associated with the out-of-stock product that, upon the end user clicking the call-to-action button, enables the end user to see the filtered and identified similar products displayed in a window, wherein each filtered and identified similar product is displayed with a call-to-action button for purchasing the filtered and identified similar product.

2. The method of claim 1, wherein the publisher preferences for a non-merchant publisher are determined by the system based on the non-merchant publisher's prior behavior.

3. The method of claim 1, wherein the publisher preferences for a non-merchant publisher are based on explicit preferences provided to the system by the non-merchant publisher.

4. The method of claim 1, wherein the one or more publisher preferences include a merchant category or group of merchants associated with the non-merchant publisher site from which the call-to-action request was initiated, wherein the system filters out similar products from merchants outside the merchant category or group.

5. The method of claim 1, wherein providing the user interface that enables the non-merchant publisher to create call-to-action comprises providing a user interface in which a non-merchant publisher can create a product widget, associate the product widget with one or more products in the product database, and embed the product widget in the non-merchant publisher site.

6. A non-transitory computer-readable medium comprising a computer program that, when executed by a computer system, enables the computer system to perform the following method for enabling similar product recommendations on a plurality of non-merchant publisher sites that promote merchant products, wherein the non-merchant publishers are not affiliated with the merchants and wherein the similar product recommendations are for sold-out products, the method comprising:
  maintaining a product database with products from a plurality of merchants, wherein each product entry in the database is associated with a product ID, an associated merchant, a link to a webpage on the associated merchant's site, and an indicator of whether the product is in stock at the associated merchant;
  providing a user interface to the product database that enables a plurality of non-merchant publishers, each associated with a different non-merchant publisher site, to search the product database and to create call-to-actions on the different non-merchant publisher sites with respect to products in the product database, wherein a call-to-action uses a product widget that displays product information for a product in the product database and a call-to-action button for purchasing the product, and wherein the product widget initiates a call-to-action request to the system in response to an end user selecting the call-to-action button;
  providing an application programming interface to the system that enables the system to receive call-to-action selections from end users of the different non-merchant publisher sites with respect to products in the product database;
  receiving, at the application programming interface, call-to-action selections from end users on the different non-merchant publisher sites for products in the product database that are out of stock, wherein the call-to-action selections are entered through the non-merchant publisher sites and transmitted by client applications running the non-merchant publisher sites;
  for each of the call-to-action selections received for products that are out of stock, performing the following:
    identifying a plurality of similar products to the out-of-stock product in the product database by comparing product images and/or product metadata in the product database;
    filtering the identified similar products by one or more publisher preferences specific to the non-merchant publisher associated with the call-to-action selection; and
    displaying, using the product widget, a call-to-action button associated with the out-of-stock product that, upon the end user clicking the call-to-action button, enables the end user to see the filtered and identified similar products displayed in a window, wherein each filtered and identified similar product is displayed with a call-to-action button for purchasing the filtered and identified similar product.

7. The non-transitory computer-readable medium of claim 6, wherein the publisher preferences for a non-merchant publisher are determined by the system based on the non-merchant publisher's prior behavior.

8. The non-transitory computer-readable medium of claim 6, wherein the publisher preferences for a non-merchant publisher are based on explicit preferences provided to the system by the non-merchant publisher.

9. The non-transitory computer-readable medium of claim 6, wherein the one or more publisher preferences include a merchant category or group of merchants associated with the non-merchant publisher site from which the call-to-action request was initiated, wherein the system filters out similar products from merchants outside the merchant category or group.

10. The non-transitory computer-readable medium of claim 6, wherein providing the user interface that enables the non-merchant publisher to create call-to-action comprises providing a user interface in which a non-merchant publisher can create a product widget, associate the product widget with one or more products in the product database, and embed the product widget in the non-merchant publisher site.

11. A computer system for enabling similar product recommendations on a plurality of non-merchant publisher sites that promote merchant products, wherein the non-merchant publishers are not affiliated with the merchants and wherein the similar product recommendations are for sold-out products, the system comprising:
   one or more processors;
   one or more memory units coupled to the one or more processors, wherein the one or more memory units store instructions that, when executed by the one or more processors, cause the system to perform the operations of:
      maintaining a product database with products from a plurality of merchants, wherein each product entry in the database is associated with a product ID, an associated merchant, a link to a webpage on the associated merchant's site, and an indicator of whether the product is in stock at the associated merchant;
      providing a user interface to the product database that enables a plurality of non-merchant publishers, each associated with a different non-merchant publisher site, to search the product database and to create call-to-actions on the different non-merchant publisher sites with respect to products in the product database, wherein a call-to-action uses a product widget that displays product information for a product in the product database and a call-to-action button for purchasing the product, and wherein the product widget initiates a call-to-action request to the system in response to an end user selecting the call-to-action button;
      providing an application programming interface to the system that enables the system to receive call-to-action selections from end users of the different non-merchant publisher sites with respect to products in the product database;
      receiving, at the application programming interface, call-to-action selections from end users on the different non-merchant publisher sites for products in the product database that are out of stock, wherein the call-to-action selections are entered through the non-merchant publisher sites and transmitted by client applications running the non-merchant publisher sites;
      for each of the call-to-action selections received for products that are out of stock, performing the following:
         identifying a plurality of similar products to the out-of-stock product in the product database by comparing product images and/or product metadata in the product database;
         filtering the identified similar products by one or more publisher preferences specific to the non-merchant publisher associated with the call-to-action selection; and
         displaying, using the product widget, a call-to-action button associated with the out-of-stock product that, upon the end user clicking the call-to-action button, enables the end user to see the filtered and identified similar products displayed in a window, wherein each filtered and identified similar product is displayed with a call-to-action button for purchasing the filtered and identified similar product.

12. The system of claim 11, wherein the publisher preferences for a non-merchant publisher are determined by the system based on the non-merchant publisher's prior behavior.

13. The system of claim 11, wherein the publisher preferences for a non-merchant publisher are based on explicit preferences provided to the system by the non-merchant publisher.

14. The system of claim 11, wherein the one or more publisher preferences include a merchant category or group of merchants associated with the non-merchant publisher site from which the call-to-action request was initiated, wherein the system filters out similar products from merchants outside the merchant category or group.

15. The system of claim 11, wherein providing the user interface that enables the non-merchant publisher to create call-to-action comprises providing a user interface in which a non-merchant publisher can create a product widget, associate the product widget with one or more products in the product database, and embed the product widget in the non-merchant publisher site.

\* \* \* \* \*